UNITED STATES PATENT OFFICE.

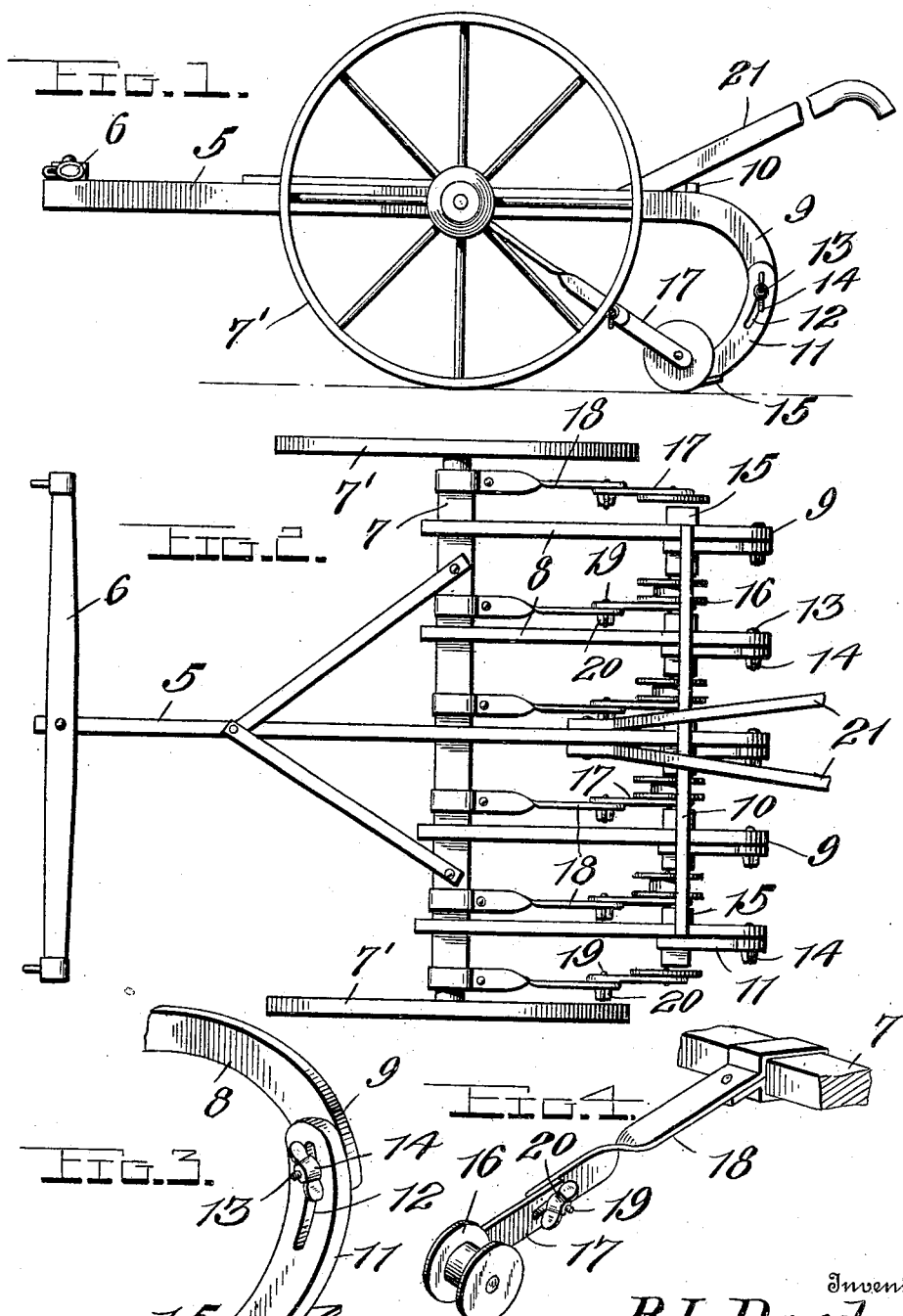

ROBERT L. DARDEN, OF JULIETTE, GEORGIA.

COTTON-CHOPPER.

979,264. Specification of Letters Patent. Patented Dec. 20, 1910.

Application filed June 21, 1910. Serial No. 568,219.

*To all whom it may concern:*

Be it known that I, ROBERT L. DARDEN, a citizen of the United States, residing at Juliette, in the county of Monroe and State of Georgia, have invented certain new and useful Improvements in Cotton-Choppers, of which the following is a specification, reference being had to the accompanying drawings.

This invention relates to improvements in cotton chopping machines and has for its object to provide a very simple and efficient machine of this character whereby the thinning of the cotton rows may be speedily and satisfactorily accomplished.

A further object of the invention resides in the provision of a plurality of adjustable foot members each of which has secured to its end a cutting blade, and a double disk fender disposed between the ends of the adjacent cutting blades to guard the cotton which is to be left standing in the row and prevent the same being cut by said blades.

With these and other objects in view, the invention consists of the novel features of construction, combination and arrangement of parts hereinafter fully described and claimed, and illustrated in the accompanying drawings, in which—

Figure 1 is a side elevation of a machine constructed in accordance with my invention; Fig. 2 is a top plan view thereof; Fig. 3 is an enlarged detail perspective view of one of the blade carrying foot members and its supporting bar; and Fig. 4 is a detail perspective view of one of the fenders showing the means for mounting the same.

Referring more particularly to the drawings 5 indicates a beam to one end of which the draft attachments 6 are connected in the usual manner. A cross bar 7 is secured to the beam 5 adjacent to its rear end and to this cross bar a plurality of rearwardly extending foot supporting bars 8 are secured. The ground wheels 7' are arranged upon opposite ends of the cross bar 7 and support the frame structure as the animals are driven across the field. The rear ends of the bars 8 are curved or bent downwardly as shown at 9 and a brace 10 extends across said bars in parallel relation to the cross bar 7. Diagonal brace bars extend from the ends of the cross bar 7 to the forward end of the beam 5, thus providing a very rigid and substantial frame construction.

To the rear and downwardly extending ends of the bars 8, the foot members 11 are adjustably secured. The upper end of each of these members is slotted as shown at 12 to receive a threaded stud 13 fixed in the end of the bar 8. Upon these studs the wing nuts 14 are threaded for clamping engagement with the foot members 11 whereby said members are secured in their adjusted positions. To the lower end of each of the members 11 a cutting blade 15 is secured. It will be noted that the members 11 are curved throughout their length and by adjusting the same upon the ends of the bars 8, the cutting blades 15 may be disposed at any desired angle with relation to the ground surface.

The cutting blades 15 are disposed in the same transverse plane and between the ends of adjacent blades a fender is disposed whereby the liability of too great an amount of the cotton being cut from the row as the machine moves across the field is obviated. Each of these fenders comprises spaced disks 16 which are mounted upon the end of a bar 17. This bar is adjustably secured to the end of an arm 18 fixed upon the cross bar 5 on the machine frame. A bolt 19 extends through and connects the bar 17 to the arm 18 and has threaded on its end a wing nut 20 whereby said bar may be rigidly secured to the end of the frame. The fender disks 16 are disposed adjacent to the ends of the adjacent cutting blades, the intermediate hub portion of the fender between said disks engaging the cotton stalks, the disk 16 effectually preventing the contact of the blades 15 with said stalks. As the foot members 11 are adjusted upon the ends of the bars 8 to angularly position the cutting blades, the bars 17 are also adjusted upon the ends of the arms 18 so as to move the fender in substantially the same arc as the foot members whereby the fender disks may be disposed between the ends of the cutting blades irrespective of the angle at which they are positioned, said fenders being rigidly secured in their adjusted positions by means of the wing nuts 20. It will be understood that the fenders at the ends of the machine will carry but a single disk 16. The blades 15 would preferably be detachably secured to the ends of the foot members 11 so that other blades of greater or less length may be attached thereto whereby the amount of cotton cut from the rows is regulated. The spaced fender disks 16 are also preferably removably mounted upon the ends of the arms 17 so that other pairs of disks which are spaced at various distances apart may be arranged thereon in accordance with the spaces between the ends of the cutting blades.

Handles 21 are secured to the beam 5 and extend rearwardly of the frame. The operator walks behind the machine as the same moves across the cotton rows and as the cotton is cut from the rows the operator lifts the cutting blades by means of the handles 21 to arrange the cotton which has been chopped out in piles between the rows. If desired the fenders may be removed together with a number of the foot members 11 and the machine used as a cultivator.

From the foregoing it will be seen that I have provided a machine of comparatively simple construction whereby the cotton rows may be quickly thinned. The cutting blades may be easily and quickly adjusted to enter the soil at any desired angle and cut the cotton stalks close to the ground surface and remove the superfluous cotton together with grass or weeds which accumulate in the row. The machine is also very strong and durable and may be manufactured at a comparatively low cost.

Having thus described the invention what is claimed is:—

1. The combination of a wheel supported frame, a plurality of rearwardly and downwardly extending bars arranged in said frame, a curved foot member longitudinally adjustable on the rear end of each of said bars, means for securing said foot members in their adjusted positions, a cutting blade secured to the lower end of each of the foot members and extending upon opposite sides thereof, arms rigidly secured to the frame, a bar pivoted upon the end of each of said arms, said bars each having spaced disks rotatably mounted on their rear ends and disposed between the opposed ends of adjacent cutting blades, said bars being adapted to be adjusted on the ends of the arms to swing the disks and maintain them in the same transverse plane with the cutting blades, and means for clamping said bars upon the arms to secure the disks in their adjusted positions.

2. The combination of a wheel supported frame, a plurality of rearwardly and downwardly extending bars arranged in said frame, a curved foot member on the end of each of said bars, said foot member being longitudinally slotted, a threaded stud carried by each of the bars to extend through the slot in said foot member, a wing nut threaded on said stud for clamping engagement with the foot member to secure the same in its adjusted position, a cutting blade secured to the lower end of each of the foot members, said blades being disposed in the same plane, arms secured to the frame and extending rearwardly thereof, a bar adjustable upon the end of each of said arms, spaced fender disks arranged on the end of each of said bars, said disks being disposed between the ends of adjacent cutting blades and movable with the bars in substantially the same plane as said foot members, and means for rigidly securing said pivoted bars on the ends of the arms.

In testimony whereof I hereunto affix my signature in the presence of two witnesses.

ROBERT L. DARDEN.

Witnesses:
  W. M. CLARK,
  CHARLIE WILLIAMS.